United States Patent [19]

Sperry et al.

[11] Patent Number: 5,376,219
[45] Date of Patent: Dec. 27, 1994

[54] HIGH SPEED APPARATUS FOR FORMING FOAM CUSHIONS FOR PACKAGING PURPOSES

[75] Inventors: Charles R. Sperry, Springfield, Vt.; Laurence B. Sperry, Brookline, Mass.

[73] Assignee: Sealed Air Corporation, Saddle Brook, N.J.

[21] Appl. No.: 766,810

[22] Filed: Sep. 26, 1991

[51] Int. Cl.⁵ ............................................. B32B 31/00
[52] U.S. Cl. ................................. 156/515; 53/373.7; 53/374.2; 53/375.9; 100/93 RP; 156/553; 156/555; 156/583.5; 219/243; 219/469; 493/204
[58] Field of Search ............... 156/251, 515, 553, 555, 156/582, 583.5; 219/243, 469, 470; 100/93 RP; 53/373.7, 374.2, 375.9; 493/204

[56] References Cited

U.S. PATENT DOCUMENTS

| | | |
|---|---|---|
| 2,640,798 | 6/1953 | Langer . |
| 2,961,031 | 11/1960 | Fener . |
| 3,087,040 | 4/1963 | van der Meulen . |
| 3,253,122 | 5/1966 | Kochmer et al. ............... 219/243 |
| 3,393,291 | 7/1968 | Tucker . |
| 3,553,059 | 1/1971 | Stohlquist . |
| 4,115,182 | 9/1978 | Wildmoser . |
| 4,213,031 | 7/1980 | Färber ............................ 156/582 X |
| 4,218,639 | 8/1980 | Sanguu . |
| 4,319,952 | 3/1982 | Schjeldahl . |
| 4,573,955 | 3/1986 | Mory et al. ..................... 493/204 |
| 4,791,275 | 12/1988 | Lee et al. ........................ 219/469 |
| 4,800,708 | 1/1989 | Sperry ............................. 53/449 |
| 4,854,109 | 8/1989 | Pinarer et al. ................... 53/397 |
| 4,898,327 | 2/1990 | Sperry et al. ................... 239/1 |
| 4,999,975 | 3/1991 | Willden et al. .................. 53/451 |

FOREIGN PATENT DOCUMENTS

| | | |
|---|---|---|
| 0515338 | 11/1992 | European Pat. Off. . |
| 1166776 | 11/1958 | France . |
| 1479770 | 7/1969 | Germany . |
| 2255762 | 5/1973 | Germany . |
| 2411387 | 3/1974 | Germany . |
| 3629497 | 3/1988 | Germany . |
| 58-110429 | 6/1983 | Japan . |
| 539127 | 6/1941 | United Kingdom . |

*Primary Examiner*—Michael W. Ball
*Assistant Examiner*—Paul M. Rivard
*Attorney, Agent, or Firm*—Bell, Seltzer, Park & Gibson

[57] ABSTRACT

A sealing and severing apparatus is disclosed for sealing plastic bags formed in succession from stock plastic film material and then severing the sealed bags from one another. The bags are filled with a foamable composition while they are being formed so that when the formed and filled bags are placed in a container, the foamable composition fills the bag with foam to thereby produce a customized foam cushion for any objects in the container.

14 Claims, 5 Drawing Sheets

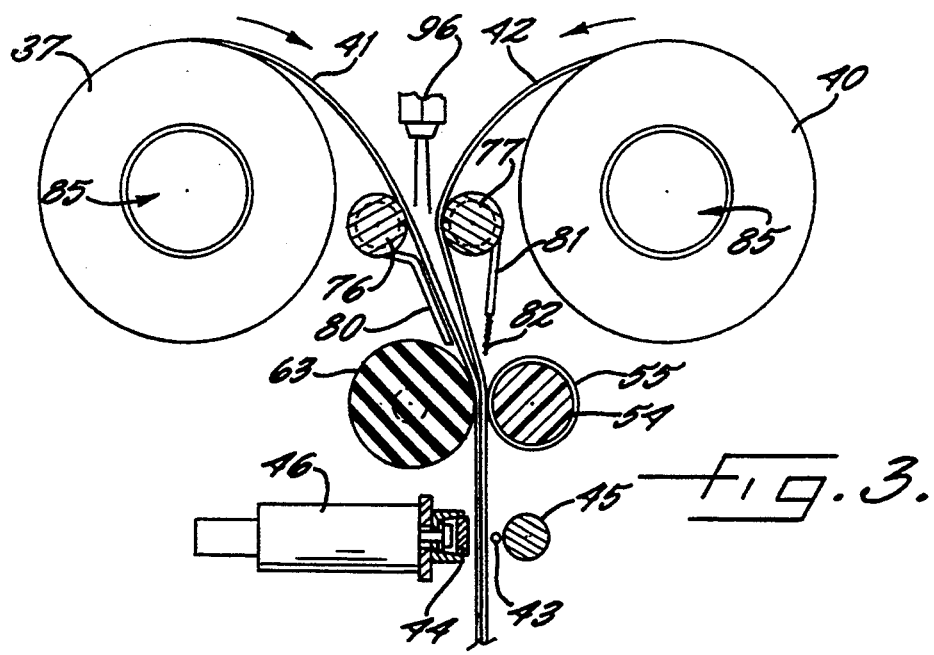
fig. 3.
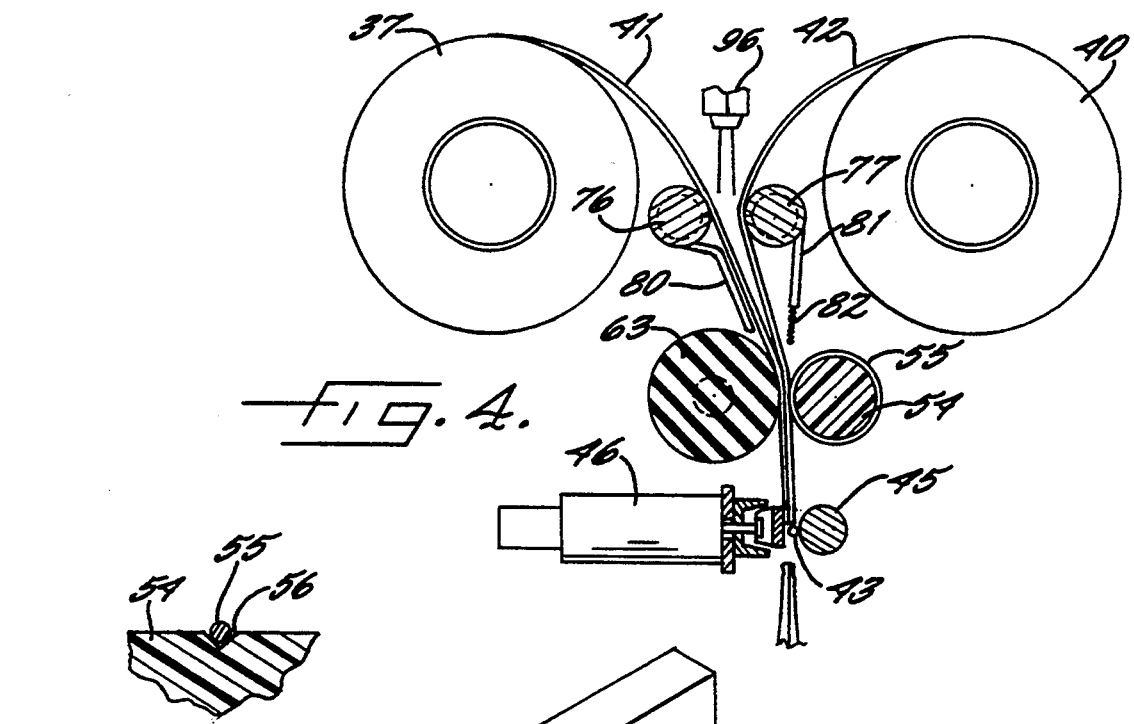
fig. 4.
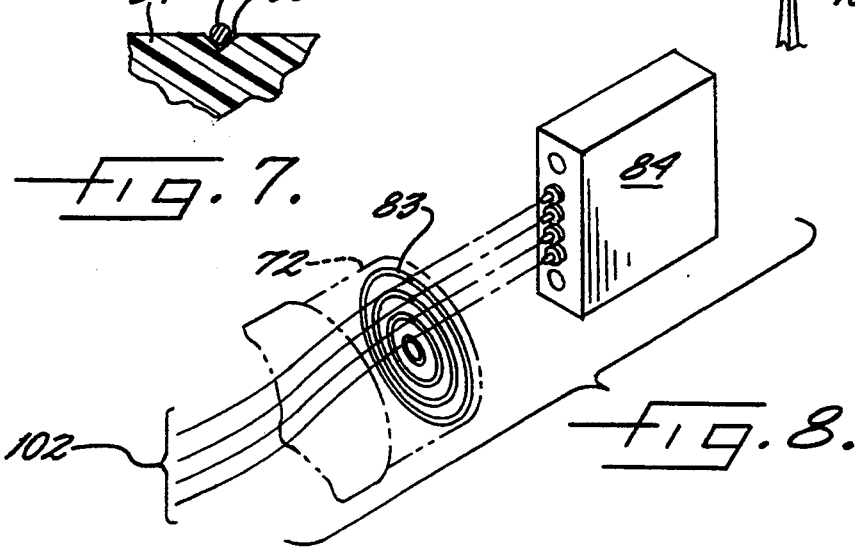
fig. 7.
fig. 8.

5,376,219

HIGH SPEED APPARATUS FOR FORMING FOAM CUSHIONS FOR PACKAGING PURPOSES

FIELD OF THE INVENTION

The present invention relates to methods for forming and filling plastic bags with foam for packaging purposes, and in particular relates to a high speed, just-in-time apparatus for such purposes.

BACKGROUND OF THE INVENTION

This invention is an apparatus for forming foam cushions for packaging purposes. It is related to the apparatus and methods described in U.S. Pat. Nos. 4,800,708, and 4,854,109, both assigned to the assignee of the present application. These patents are incorporated entirely herein by reference. As set forth in these patents, such apparatus are used to automatically fabricate foam filled bags. The foam is initially added to the bag as a foamable composition or as foam precursors, typically polymeric compositions, and after which the bag is placed in a container with an object to be protected by the foam. The nature of the foamable composition causes it to generate gases such as carbon dioxide and water vapor which form bubbles in the polymer to create the foam as the polymer hardens or sets. The apparatus described in the '708 and '109 patents have met with a great deal of success in the marketplace, and accordingly they have been subject to further study and improvements which are the focus of the present invention. In particular, the present invention has been addressed at increasing the speed of operation and the simplicity of operating and maintaining the apparatus.

The present invention provides a flexible and complete foam-in-place protective packaging system which is extremely sophisticated in functions and flexibility, but simple to operate and maintain. The system can work in numerous configurations including a stand alone configuration or in conjunction with a conveyor. It will be understood that the invention can be operated independently with its own chemical supply, or it can be included with a number of other units sharing bulk chemical supplies located in remote locations. The present invention can also be integrated in a line with box forming and closure systems to provide a complete packaging system. The present invention can create foam filled bags of varying lengths and fill percentages, in "just-in-time" fashion, for a wide variety of protective packaging applications.

OBJECT AND SUMMARY OF THE INVENTION

In one aspect, the invention can be viewed as a sealing and severing apparatus for successively forming, filling and sealing plastic bags from stock plastic film material and then severing the bags from one another. In this aspect, the apparatus comprises a crosscut wire for severing plastic film in contact with the wire when the wire is heated to an appropriate temperature, means for heating the wire, and means for bringing the plastic film material from which the bags are formed into contact with the wire.

In another aspect, the invention can be viewed as a sophisticated sealing roller system for sealing plastic film material that is in moving contact with the sealing roller.

In yet another aspect, the invention can be considered to be a feeding system for feeding a web of plastic film material from a supply roll at a desired tension regardless of the supply of film material on the supply roll, and of controlling the tension on a web of plastic film material fed from a rotating supply roll.

In another aspect, the invention comprises a method of substantially matching the tension applied to two opposing webs of film material that are being brought together to be sealed and formed into bags.

The foregoing and other objects, advantages and features of the invention, and the manner in which the same are accomplished, will be more readily apparent upon consideration of the following detailed description of the invention taken in conjunction with the accompanying drawings, which illustrate preferred and exemplary embodiments, and wherein:

DESCRIPTION OF THE DRAWINGS

FIG. 3 is a cross-sectional view of the roll feeding side sealing and crosscut portions of the present inventions:

FIG. 4 is a cross-sectional view similar to FIG. 3 but showing a further step in the process;

FIG. 5 is an exploded view of a number of the key features of the invention, particularly the film feeding and sealing and crosscutting aspects;

FIG. 6 is a partially exploded perspective view of the side edge sealing portion of the invention;

FIG. 7 is a cross-sectional view taken along lines 7—7 of FIG. 6;

FIG. 8 is a partially exploded perspective view of the electrical contact portion of the side seal assembly of FIG. 6;

DETAILED DESCRIPTION OF THE INVENTION

Figure 1:
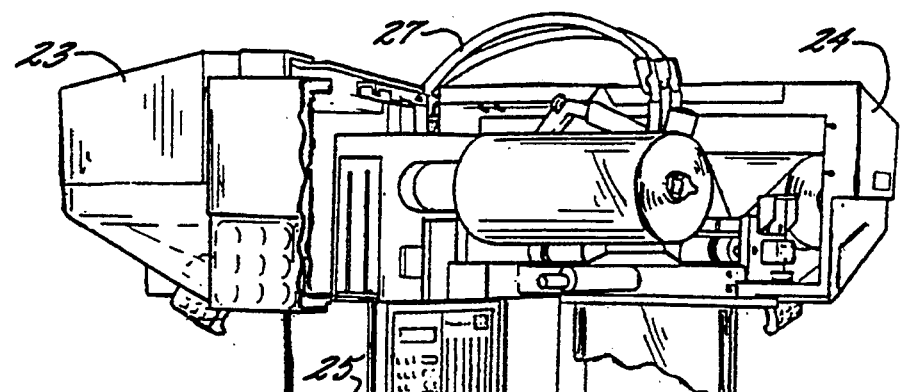
FIG. 1 is an overall perspective view of the invention in its housing and on its frame support.

FIG. 1 is an overall perspective view of the entire apparatus which is generally designated at 20. The apparatus includes a support frame assembly 21, portions of which are shown as the legs and rollers in FIG. 1. The support frame is covered by a series of removable panels which are designated as 22, 23, and 24 in FIG. 1. Reference numeral 22 indicates those portions of the removable panels that cover the upright portions of the support frame, and reference numerals 23 and 24 designate the cover portions for the plastic film feed, fill and seal portions of the apparatus. FIG. 1 also shows an operator control panel assembly 25 and the main power switch 26. FIG. 1 additionally illustrates a pair of hoses 27 that supply the foam-in-place chemicals, usually supplied in two components that are mixed just as they are placed in the bag. These components are fed from a supply system which, as explained earlier, can either be an individual stock supply for one device, or a bulk supply for several such devices. The hoses lead to an injection cartridge that is not shown in FIG. 1, but rather is positioned behind one of the rolls of plastic sheet material in the view according to FIG. 1.

Figure 2:
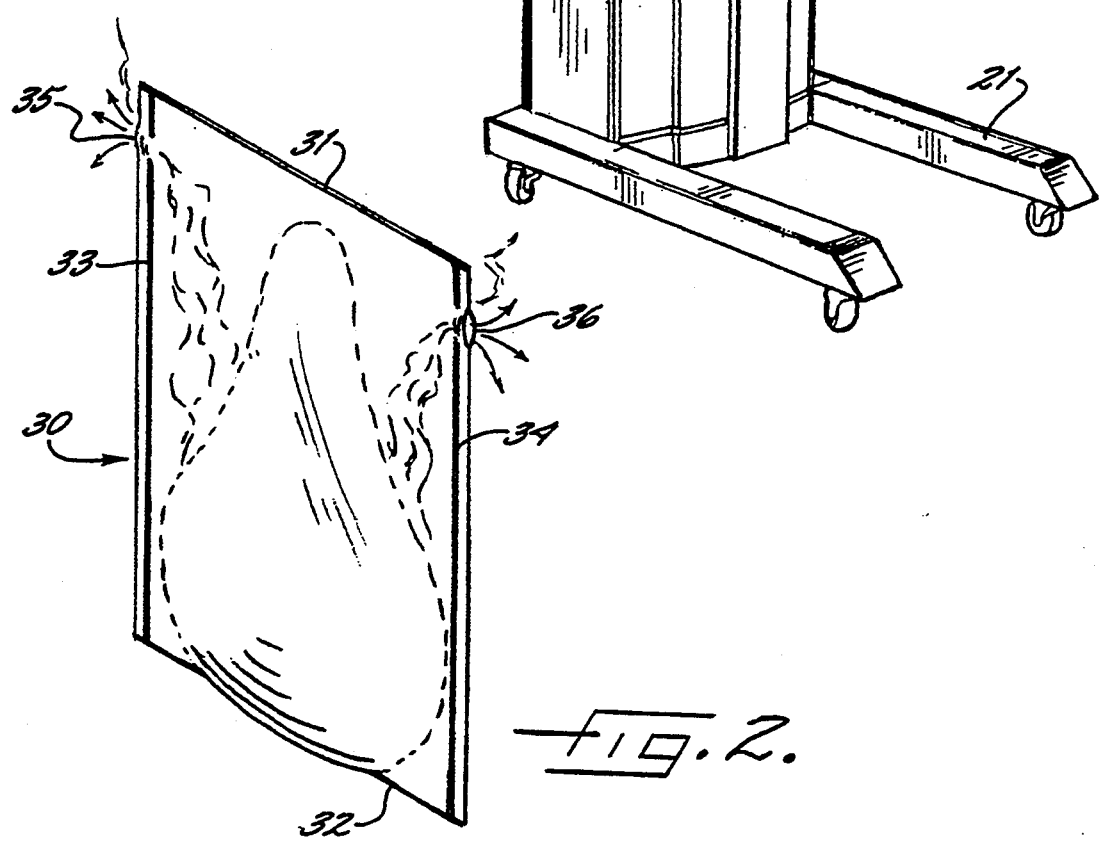
FIG. 2 illustrates a bag of the type formed by the present invention.

FIG. 2 illustrates a bag of the type generally formed by the apparatus 20. The bag is designated broadly at 30 and comprises a top seal 31 a bottom seal 32, respective side seals 33 and 34, and respective vent openings 35 and 36. The openings 35 and 36 permit the gases generated by the foam precursors to exit the bag 30. In the absence of these openings, the gas pressure would generally rupture the bag and thus destroy its usefulness, and perhaps damage the very items it was intended to protect.

THE CROSSCUT SEVERING AND SEALING SYSTEM

FIGS. 3 and 4 illustrate a number of the crosscut sealing and severing features of the invention in somewhat more detail.

These figures illustrate respective supply rolls of plastic film material 37 and 40. As illustrated therein, the supply rolls 37 and 40 forward respective sheets 41 and 42 of plastic film material into the device. As a first point of explanation, the invention comprises a sealing and severing apparatus for sealing plastic bags formed in succession from stock plastic film material and then severing the sealed bags from one another. Thus the invention comprises a crosscut wire 43 which when heated first seals the plastic film material 41 and 42 together, and then severs it so as to concurrently form the bottom of one bag and the top of the next while separating those bags from one another. The crosscut wire 43 is appropriately connected to means for heating the wire to a temperature that will sever plastic film material, typically a source of electric current, in which case the wire 43 is formed of nichrome or another suitable metal or alloy.

As used herein, the term "sealing" wire is used interchangeably with the phrase "crosscut" wire to designate that the wire 43 makes the top and bottom or "crosscut" seals in the advancing plastic film and the resulting bags.

With regard to the description of FIGS. 3 and 4, it will be understood that many of the same features are illustrated in FIG. 5 in exploded fashion.

An actuator bar 44 is positioned parallel to the wire 43. The actuator bar 44 is preferably formed of a flexible material as it has been found that in working with foam-in-place bags and the related machinery, the presence of hardened foam can cause problems in operating such devices. In particular, hardened foam tends to interfere with overly ridged elements that have closely defined movements. Because of the nature of commonly used foamable compositions, i.e. separate liquids that generate gases while solidifying into foam, excess hardened foam is almost always present in and around the apparatus. Stated somewhat differently, because the actuator bar 44 is flexible, excess foam on the exterior of a bag or otherwise present in its vicinity that it encounters will not prevent the actuator bar 44 from operating in the manner described herein.

Additionally, the flexibility of the actuator bar 44 helps exert an equal force across the entire sealing area.

A sealing roller 45 is also positioned parallel to the wire 43 and to the actuator bar 44, and is on the opposite side of the wire 43 from the bar 44. The sealing roller 45 is preferably similarly formed from a flexible material, and for the same reasons as the actuator bar 44. A driver shown as the solenoid 46 is operatively connected to the actuator bar 44 for driving the bar 44 against the wire 43 and then the wire 43 against the sealing roller 45 to thereby seal and sever plastic film material 41 and 42 passing between the sealing wire 43 and the bar 44. Because the sealing roller 45 can rotate, it tends to present a slightly different portion of itself during repeated sealing cycles, even though its rotation is not specifically driven. Additionally, if an operator decides that the roller should be turned, he can do so easily by hand.

In preferred embodiments, the driver is a two coil solenoid for actively driving the actuator bar 44 in opposite directions as desired. The nature of the force exerted by a solenoid is also such that the force is maximized when the solenoid is most fully extended, and minimized otherwise, so that if an operator should by accident place his hand in overly close proximity to the actuator bar 44 and the roller 45, the force exerted if the hand were struck or caught between parts is minimized and would thus minimize or eliminate injury to the operator.

Further to this safety feature, the heating means for the wire further comprises means for preventing the wire from heating until the actuator bar is in contact with the flexible sealing roller. This is accomplished electronically by use of a "smart switch" that prevents the wire from being heated until the actuator bar is in contact with the flexible sealing roller.

As part of the operation of the sealing wire 43 and the associated parts just described, there is, of course, means for feeding plastic film material between the wire and the flexible sealing roller, and these will be described in more detail further herein.

In a preferred embodiment, the crosscut sealing wire 43 further comprises a respective spring at opposite ends thereof for mounting the crosscut wire against the tension of the spring, and means on the apparatus for receiving the springs so that the sealing wire can be positioned and maintained in position in the absence of other attachment. This is perhaps best illustrated in FIG. 5 in which the wire 43 is shown connected to respective handles 47. The handles can fit into the respective mounting plates 50 and 51 by being placed in the respective openings 52 and 53. The spring portions of wire 43, which are generally too small to be clearly illustrated in the scale of FIG. 5, are positioned at either terminal end of the wire 43 immediately adjacent to handles 47.

The spring portions of the wire 43 also permit it to remain appropriately taut and in place during thermal expansion and contraction as an appropriate heating current is applied through it.

Additionally, in preferred embodiments the terminal portions of the crosscut wire include means for reducing the electrical resistance through the terminal portions. By reducing the resistance, these portions—which often do not come in contact with plastic film to be sealed—remain cooler and avoid wasting electrical and thermal energy. In one preferred embodiment the wire 43 is double wrapped at the terminal portions thereof for reducing undesired heat dissipation from the wire, but the reduction in resistance could similarly be accomplished by other conventional means.

In the preferred embodiment, the sealing and severing apparatus further comprises means for maintaining the crosscut sealing wire at an idling temperature that is above ambient temperature but below the temperature at with sealing takes place to thereby provide for more rapidly raising said sealing wire to the sealing and severing temperature whenever desired.

In a preferred embodiment, the means for maintaining the crosscut wire at the idling temperature comprises means for applying an idling voltage to the wire that keeps it at an elevated temperature, but a temperature that is below that at which the plastic film material would become severed. Thus, in order to raise the temperature to severing temperature, an additional voltage is applied which quickly raises the temperature. This ability to rapidly raise the temperature is one of the features which greatly increases the speed of the overall device.

Perhaps just as importantly, because the wire 43 is kept in a preheated condition, its temperature changes less drastically when it is raised to sealing temperature. The less drastic temperature excursion reduces the physical expansion and contraction of the wire 43 and thus moderates fatigue and increases the usable lifetime of the wire.

THE EDGE SEALING SYSTEM

As another feature which increases the overall speed of the apparatus, the invention comprises an improved system for sealing plastic film material that it is in moving contact with a sealing roller. As illustrated by FIG. 2, and as set forth in clear detail in the '109 and '708 patents, one of the main steps in formation of a foam filled bag is sealing the side portions to form the two side edges of the bag. In the respective devices described in the '109 and '708 patents, this was done by bringing a heated metal roller into contact with the advancing plastic film material so that the heated metal formed the side seals as the plastic film advanced. Because heated metal rollers where used, however, they had to be mechanically moved into, and then out of, contact with the advancing film material to form the seal, to leave an unsealed portion to act as the vent opening 36, or to keep the device in an idling mode if the next bag was not immediately needed.

The sealing roller system of the present invention improves on this tremendously by using a rotatable cylinder illustrated in the drawings at 54. The rotatable cylinder 54 is formed of a thermally conductive polymer material for dissipating heat quickly therefrom. Suitable polymer materials include the VESPEL® polyimide materials available from DuPont.

A sealing wire 55 is wrapped around the circumference of the polymer cylinder 54. The sealing wire 55 is illustrated in exploded fashion with respect to the rotatable cylinder 54 in FIG. 5 and schematically illustrated as surrounding the cylinder 54 in FIGS. 3 and 4.

As further illustrated in the cross sectional view of FIG. 7, the wire 55 fits in a slight groove 56 in the circumference of the rotatable cylinder 54 and receives the sealing wire 55 therein.

Figure 9:
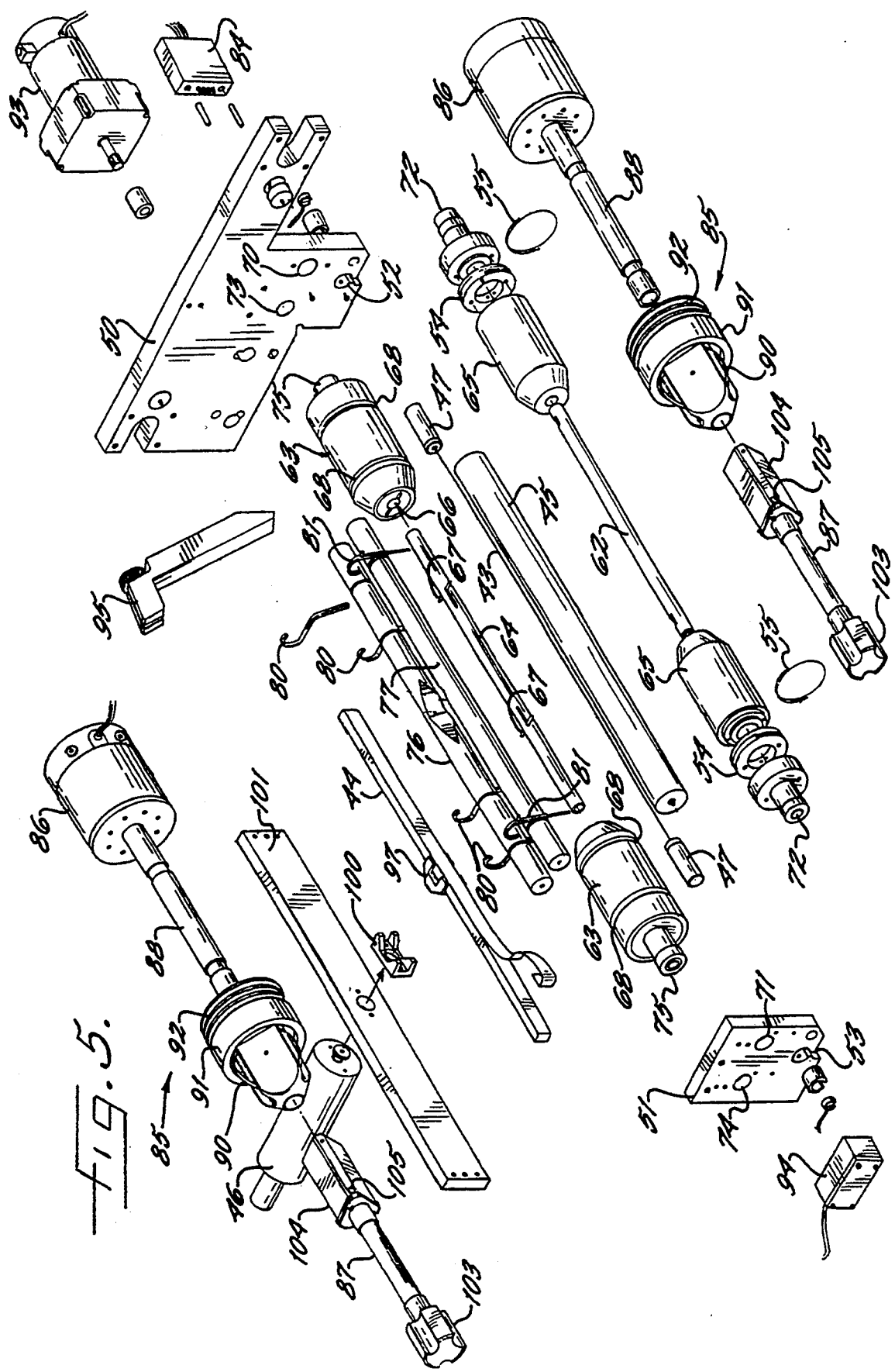
FIG. 9 is a partial perspective view of a portion of the side edge seal apparatus in relationship to the other portions of the apparatus.
Figure 10:
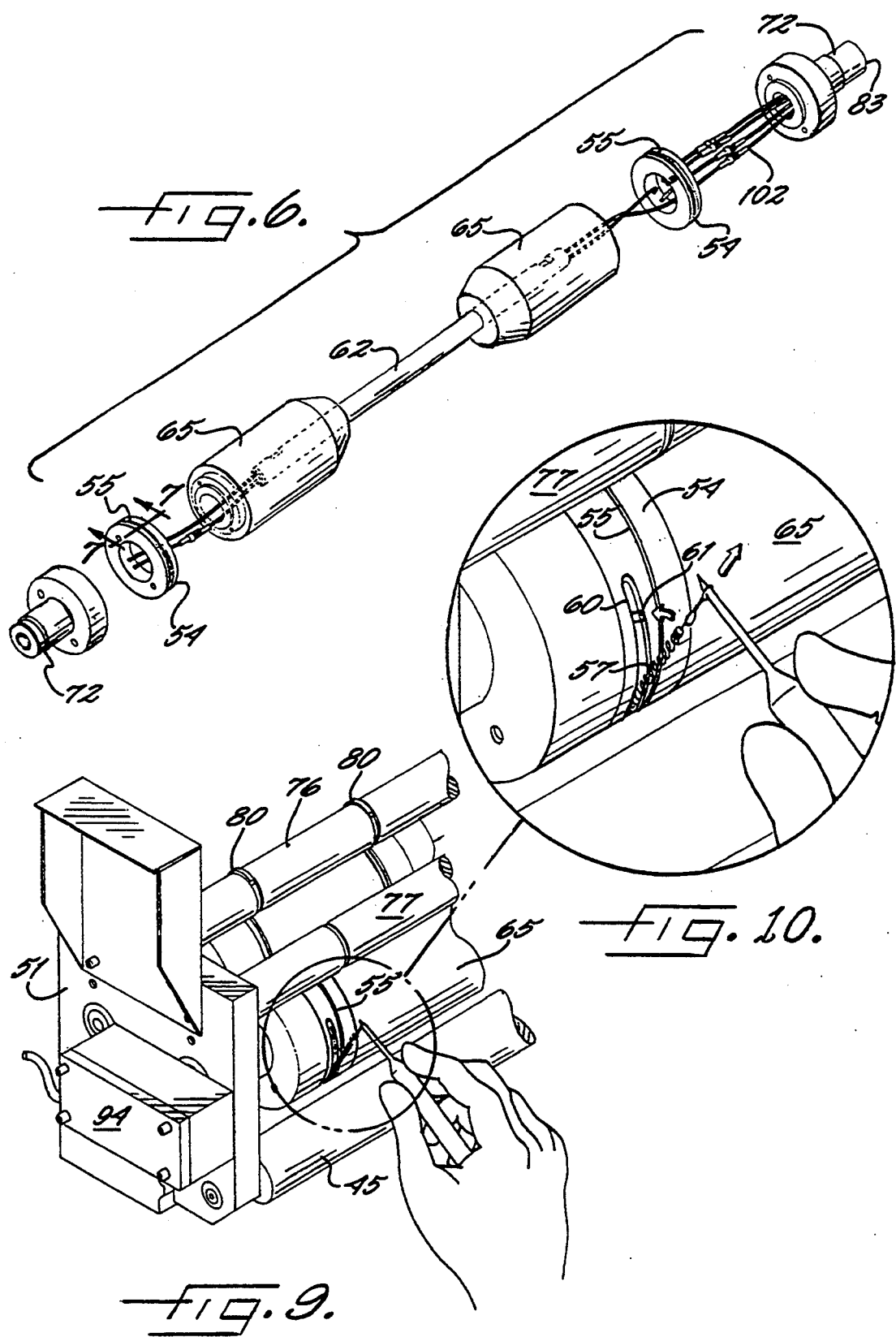
FIG. 10 is an enlarged view of a portion of FIG. 9 as indicated therein.

FIGS. 6, 9, 10, and 13 illustrate further features the sealing roller system. FIGS. 9 and 10 illustrate that a spring 57 is at either end of the sealing wire 55 and applies a bias to the wire that maintains it in the groove 56 during expansion and contraction of the wire as its temperature increases and decreases. In this regard, the sealing roller system includes means for raising the temperature of the sealing wire to a heated temperature that will seal plastic film material so that when plastic film material such as 41 and 42 passes against the cylinder 54, the heated wire 55 seals the plastic film material.

Generally speaking, the means used to raise the temperature comprises a source of electric current that can be supplied to the wire 55 in otherwise conventional fashion.

Figure 13:
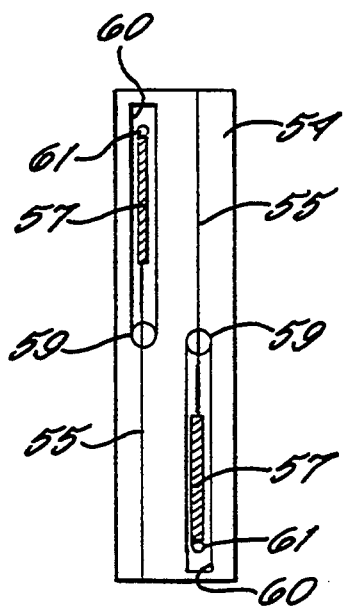
FIG. 13 is a side elevational view of the side seal assemby of the present invention.

Because the spring 57 is larger in diameter than the wire 55, a spring receiving recess 60 is provided in the cylinder 54 for keeping the spring 57 out of contact with the plastic film 41 and 42 during edge sealing. A pair of respective pins 61 are present in the respective recesses 60 for attaching the springs 57 thereto so that the bias of the springs 57 helps maintain the wire 55 in the groove 56 and on the cylinder 54. FIG. 13 illustrates that each cylinder 54 has a pair of corresponding pins 61 and recesses 60.

In preferred embodiments, the cylinder 54 includes a pair of electrical contacts 59 (FIG. 13) across which the wire 55 passes so that a voltage applied to the contacts 59 will be correspondingly applied to the wire 55 to heat the wire 55 as the applied voltage generates a current therethrough. In this regard, the springs 57 help maintain good electrical contact by urging the wire 55 against the contacts 59.

In the most preferred embodiment, this system further comprises means for maintaining an idling voltage in the sealing wire 55 that maintains the wire 55 at a temperature below the temperature at which the wire 55 will seal the plastic film material 41 and 42, but which allows the wire 55 to more quickly reach such a sealing temperature upon desired command. The use of an idling voltage also reduces temperature excursions and metal fatigue in essentially the same manner as does the use of the idling voltage with the crosscut wire 43.

As further indicated by the drawings, particularly FIG. 13, the wire 55 is preferably wrapped around the cylinder 54 in a slight spiral pattern in a direction which prevents foam from escaping from the bag as it is being formed.

The purpose of providing the cylinder 54 from a thermally conductive material is to provide for rapid dissipation of heat from the wire. In other words, in the prior devices such as described in the '109 and '708 patents, the necessary vent openings 35 and 36 in the bag 30 were formed by physically moving the side edge rollers out of contact with the plastic material for a short period of time to thus leave the unsealed portion. This mechanical movement required a finite amount of time, however, which in turn reduced the speed with which any individual bag could be formed, and thus reduced the device's overall rate of bag formation.

The invention addresses this problem with the combination of the wire 55 and the thermally conductive cylinder 54. Because the cylinder 54 is thermally conductive, and because the sealing is done by a wire 55 rather than a metal roller as in previous versions, the openings 35 and 36 are formed in the bag by simply turning off the current to the wire 55 for a short period of time so that the wire 55 is no longer heated to the temperature at which it will seal plastic. In order to successfully accomplish this, however, heat must be carried away from the wire 55 very quickly so as to insure that the unsealed portions for the openings 35 and 36 are not undesirably sealed by residual heat in the wire. Thus, the provision of a thermally conductive polymer material for the rotatable cylinder 54 draws heat away from the wire 55 rapidly once the voltage applied to the wire is dropped. In this manner, the rotatable cylinder 54 and the sealing wire 55 can be maintained in constant contact with the plastic film material 41 and 42, while the vent openings 35 and 36 can be produced on command. Because this eliminates much of the mechanical motion in the prior devices, it greatly increases the speed with which the invention can produce foam-in-place bags.

In one embodiment of the invention which is not otherwise illustrated, the plastic sheet material, rather than being fed from two rolls as illustrated, is fed from a single roll of sheet material which is folded substantially in half to form one side edge of the resulting bag. It will be understood that in forming a bag from such stock material, the side edge sealing and top and bottom sealing will be identical to that described herein, with the sole exception being that instead of two side seals being formed, only one will be required. It will be understood that a device which uses folded plastic in such a manner is entirely within the description and claims of the present invention, and otherwise does not represent any departure from this specification, or the appended claims.

In the preferred embodiment, the invention comprises a pair of the rotatable polymeric cylinders 54 mounted on a rotatable shaft 62 (FIG. 5 and FIG. 6). In order to advance the plastic, a pair of drive rollers 63 are likewise mounted on a second rotatable shaft 64 which is parallel to the first rotatable shaft 62. The drive roller 63 are respectively positioned opposite to the polymeric cylinders 54, and the first and second shafts 62 and 64 respectively are positioned sufficiently closely for rotation of the drive rollers 63 to drive the rotation of the polymeric cylinders 54 independently of the presence or absence of plastic film material 41 and 42 between the drive roller 63 and the polymeric cylinders 54. The drawings further illustrate that the shaft 62, in order to be appropriately driven by the drive roller 63, includes some additional followers 65 which provide extra surface area to engage the drive roller 63 and to rotate the cylinders 54.

As perhaps best illustrated in FIG. 5, for convenience and simplicity of assembly, mounting, and disassembly, the drive rollers 63 are mounted on shaft 64 using keyhole openings 66 which match the shaft 64 and corresponding pins 67 in the shaft. FIG. 5 also illustrates that the shaft 62 and the other elements that it carries are mounted on the plates 50 and 51 in the openings 70 and 71 respectively therein using the hub portions 72 on either end of the shaft 62. Similarly, the shaft 64 is mounted on plates 50 and 51 in openings 73 and 74 respectively using the hub portion 75 on the shaft 64.

In this regard, it will be understood that there are a number of fasteners and the like between the respective parts that could be illustrated and described with respect to FIG. 5 but which are otherwise conventional, and thus have not been illustrated for the sake of overall clarity of the drawing and for the further sake of more clearly illustrating other features of the invention.

In a preferred embodiment, the drive rollers 63 are formed of a silicone rubber compound such as those available from General Electric under the "RTV" trademarks. As another detail of the preferred embodiment, when a pair of rotatable cylinders 54 are used, the pins 61 and the grooves 60 in one cylinder 54 are rotationally offset with respect to the other cylinder 54. This provides an additional measure of assurance that the bag will be sealed properly when formed.

As further illustrated in FIGS. 3, 4, and 5, a pair of film guides 76 and 77 are positioned above the first and second shafts 62 and 64 for receiving the plastic film 41 and 42 therebetween so that the plastic film is more efficiently presented to the drive rollers 63 and the polymeric cylinders 54. In the preferred embodiment, the film guides 76 and 77 comprise adjacent bars parallel to the first and second shafts 62 and 64 and positioned laterally away from the position at which the drive rolls 63 and polymeric cylinders 54 meet in a direction toward the drive rolls 63. This positioning encourages the plastic film material 41 and 42 to meet the drive rolls 63 prior to meeting the polymeric cylinders 54, and to thereby be more effectively advanced through the apparatus. This positioning also keeps the plastic film material away from the side edge rollers until the plastic as at the desired sealing location.

In the more preferred embodiments, the film guide bars further comprise a plurality of downwardly depending guide canes 80 and 81 which hang from the guides 76 and 77 for further directing and advancing the plastic film 41 and 42 between the drive rolls 63 and the polymeric cylinder 54 and for preventing the plastic film 41 and 42 from wrapping around either of the shafts 62 or 64 as the film 41 and 42 advances downwardly. For the sake of clarity, the canes 80 and 81 have been illustrated in FIGS. 3 and 4 as ending just above the drive rollers 63. In preferred embodiments, however, the canes 80 and 81 are somewhat longer and can extend almost as far downwardly as the solenoid 46. To accomodate this length, the drive rollers 63 have circumferential grooves 68 therein (FIG. 5) so that the guide canes will not interefere with the drive rollers or vice versa.

In the most preferred embodiments, at least some of the guide canes have flexible lower portions for preventing advancing plastic film from tearing whenever it engages the guide canes. In the figures, these flexible lower portions are shown as the small springs 82 on the guide canes 81 that are on the sealing roller side of the plastic film. Given the slight offset position of the guide bars 76 and 77 illustrated in FIGS. 3 and 4, it has been determined that the flexible lower portions are most useful in this position, as the plastic film material would otherwise be more likely to tear against guide cane 81 then against guide cane 80.

As perhaps best illustrated in FIG. 8 the first shaft 62 also has a plurality of electrical contact rings 83 on the hub portion 72 thereof. These rings 83 are in respective electrical contact with the contact 59 and the wires 55 for making electrical contact with the source of electricity, illustrated as the connector 84 in FIG. 8, and for providing a path for electrical current to flow from the source to the wires to thereby heat the wires to the temperatures required to either idle the wire or seal the plastic film material.

THE PLASTIC FILM FEEDING SYSTEM

The feeding system of the present invention comprises a rotatable shaft, two of which are illustrated in the drawings, and which are broadly designated at 85, and first portions of which are designated at 88. The rotatable shafts 85 carry the respective supply rolls 37, 40 of plastic film material. A motor 86 is connected to each shaft 85 for retarding the rotation of the shaft. Means are included for measuring the electromotive force (EMF) generated by the rotation of the shaft whenever the motor 86 is inoperative, as explained more fully herein, and means are included for controlling the force applied by the motor 86 in response to the generated EMF to thereby apply a desired amount of tension to the web of film material.

In this regard, it has been determined by use of previous apparatus, such as those described in the '109 and '708 patents, that when the rolls of 37 and 40 of plastic film material differ somewhat in size, the lever arm formed by the plastic film between the supply roll and the drive rolls correspondingly differs in length. As a result, the mechanical tension applied to each web of film by the driving force of the rollers 63 will differ, thereby causing certain problems in the advancement and production of film material and bags. As might be expected, the ideal situation is when both rolls are of the same size and thus equal tension is inherently applied. Such is generally not the case, however, in actual circumstances. Therefore, the invention has been developed and improved to provide equal tension, regardless of differences in roll sizes.

Thus, in preferred embodiments, the motors 86 comprise direct current motors. These are electrically connected to an electronic control, and to voltage and current sources so that a braking voltage can be applied to the direct current motor 86 to retard the rotation of the shaft portions 88 and in turn retard the feeding of plastic film. In other words, as illustrated by the arrows at the top of FIG. 3, the left hand roll 37 rotates in a clockwise direction as it advances plastic film material 41, and the right hand roll 40 advances in a counterclockwise direction as it advances the plastic film 42. Thus, the motor 86 that corresponds to supply roll 37 will have the capacity to drive the roll 37 in a counterclockwise direction, and likewise the motor 86 associated with supply roll 40 will have the capacity to drive roll 40 in clockwise direction.

The motors are used in a method of controlling the tension on the web of plastic film material fed from the rotating supply rolls 37 and 40. The method comprises measuring the EMF generated by the motor 86 attached to rotate with the supply roll (37 or 40) of plastic film material, and then driving the motor 86 in a direction opposite to the supply rotation with a force sufficient to provide a desired tension to the web 41 or 42 of plastic film material. In a preferred embodiment, this method comprises measuring the EMF generated by the motor at periodic intervals corresponding to periodic advancement of the web of plastic film material—i.e. the formation of one bag—and then driving the motor in the opposite direction on a periodic basis corresponding to the periodic measurement of EMF. In particular, the method comprises comparing measured EMF from the motor to a predetermined standard to determine whether the corresponding web tension is acceptable prior to the step of driving the motor in the opposite direction.

Stated somewhat differently, when the plastic film materials 41 and 42 are advancing in the fashion illustrated in FIGS. 3 and 4 in a manner which forms a bag, the motors 86 are periodically turned off for a brief period, for example about 50 milliseconds (i.e. 0.050 seconds; a bag takes approximately 2 seconds to make). During this brief period, the motors 86 do not apply any force, but are treated as generators so that an EMF is produced by the rotation of the motor as they follow the rotation of the respective supply rolls. In a manner well known to those of ordinary skill with respect to direct current motors, this EMF is a measure of the speed of rotation of the shaft 85 and is thus a measure of the tension applied to the plastic film material 41 and 42.

The electronic controls of the present invention measure this "back EMF" and use it to compute the tension applied to the individual webs 41 and 42. If the respective tensions applied to the webs 41 and 42 are different, or for any other desired reason, the motors 86 are then driven in the opposite direction for very brief periods of time to thereby drive the shafts 85 in respective opposite directions for that period of time, and thus apply the appropriate tension to the plastic film.

Thus, when two shafts are used the method can be understood as the step of advancing two opposing webs of plastic film material in periodic increments from the respective supply rolls and into face-to-face relationship, measuring the EMF generated by a respective motor attached to rotate with each supply roll of plastic film material, and then driving each respective motor in a direction opposite to the supply rotation of its supply roll, and at a force sufficient to provide a desired tension to each web being fed from each respective supply roll. In the most preferred embodiment, the motors will be driven to produce equal tensions.

Figure 11:
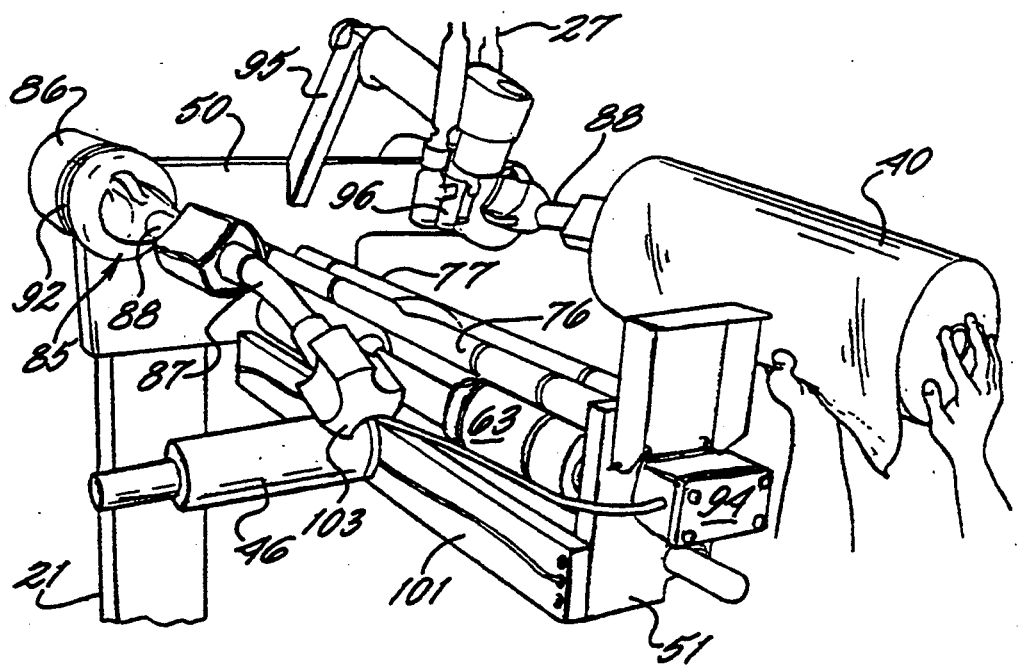
FIG. 11 is a perspective view of the film supply, edge sealing and crosscut portions of the invention.

As illustrated in FIG. 5, the film feeding system includes terminal portions 87 on the shafts 85 which are formed of a flexible material so that if an excess force is applied to these portions 87, they will flex, rather than break or otherwise damage the machine. This is particularly useful when full supply rolls such as 37 and 40 are being added to the apparatus as illustrated in FIG. 11.

Other details of the shaft 85 include a plurality of flexible bow springs 90 which help maintain the hub of a supply roll 37 or 40 on the shaft 85.

Additionally, a sensing ring 91 is positioned on the shaft 85 next to a thrust bearing 92 adjacent one edge of the supply roll such as 37 or 40 for changing position toward the supply roll when the diameter of the supply roll of plastic film material becomes smaller than the diameter of the sensing ring. In this manner, the ring 91 indicates that the supply of plastic film material has been reduced below a predetermined amount. In other words, as long as the supply of film material on supply roll 37 or 40 is sufficient to keep the diameter of the supply roll larger than the diameter of the sensing ring 91, the sensing ring 91 will be maintained at a terminal portion of the shaft 85 adjacent the motor 86 (FIG. 5 is an exploded view, and the sensing ring 91 is in use positioned adjacent the motor such as illustrated in FIG. 11). When the supply roll 37 or 40 becomes small enough, the diameter of the roll will become smaller than the sensing ring 91, at which point the rotation of the respective supply roll 37 or 40 tends to cause the sensing ring 91 to move over the supply roll to alert the operator to the reduced amount of plastic film. It has been found according to the present invention that the ordinary movement of the film is enough to cause the sensing ring 92 to move in this manner so that other bias is unnecessary and can be omitted if desired.

Some further details of the invention are illustrated in the drawings. FIG. 5, for example, also illustrates a motor 93 which drives the drive roll 63 on shaft 64. FIG. 5 additionally shows an encoder 94 for the drive system to provide feedback on the edge seal process.

FIG. 5 further illustrates a mounting bracket 95 which holds the injection nozzle that dispenses the foam precursor (not shown). For explanatory purposes, a small portion of such a nozzle is illustrated at 96 in FIGS. 3 and 4.

With respect to the actuator bar described earlier, FIG. 5 illustrates that the actuator bar includes a small male mounting bracket 97 which corresponds to a female seating bracket 100 on a stationary member 101. As described earlier, the actuator bar 44 is driven by the solenoid 46 and the relationship between the male mounting 97 and the female seat 100 is such that the actuator bar 44 is returned to a proper position each time it cycles through a sealing operation.

FIG. 5 also illustrates that in order to help secure supply rolls such as 37 and 40 on the shaft 85, the shaft includes a gripping system formed by the handle 103 and the wedge member 104. Although illustrated in exploded fashion in FIG. 5, the wedge member 104 is fixed on the shaft portion 88. A set of radially extendable pins 105 on the wedge member 104 are controlled—i.e. extended outwardly—by turning the handle 103. The extended pins 105 apply an appropriate gripping force to the interior hub of the supply roll, and thus help hold it in place.

FIG. 6 illustrates that with respect to the electrical connections formed by the electrical contact rings 83, a plurality of wires 102 carry current appropriately to the contacts 59 and wires 55 previously described with respect to the side seal mechanism.

Figure 12:
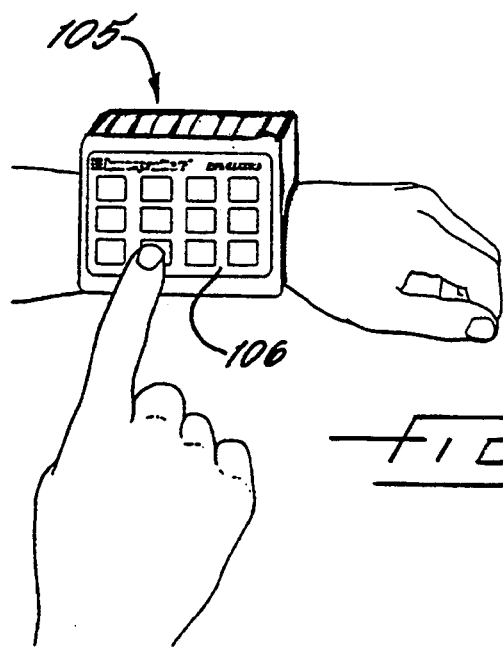
FIG. 12 is an illustration of the wrist control system according to the present invention.

Finally, FIG. 12 illustrates a particularly useful feature of the present invention, namely the use of a wrist mountable controller broadly designated at 105. The wrist controller 105 includes a control panel 106 with the appropriate buttons for controlling the length of bags produced, and the percentage of filling desired in each bag. The wrist controller 105 sends a signal to the main controller of the device through an appropriate electromagnetic signal such as a radio frequency ("RF") signal (preferably at 303.875 megahertz, MHz), that permits the operator of the machine to run it while standing some distance away from the actual control panel 25. In other words, if the apparatus 20 was used along an assembly or packaging line, the operator could stand upstream or downstream from the apparatus performing an additional task while commanding the apparatus to produce a foam-in-place bag as necessary when a container passed beneath it.

SEQUENCE OF EVENTS

A typical sequence of events thus begins when the operator pushes a foam amount button and a bag length button on the wrist control unit 105. If all conditions are satisfactory, the apparatus will feed film, dispense chemicals, and cut and seal a bag. The wrist control unit sends a signal to the console 25 to open the cartridge and dispense chemical for a preset length of time. Next, the film feed motor is activated. While the film is being fed, the edges of both sheets of film are welded together by the edge seal drive assembly as described herein. An idle voltage is kept on the edge seal wire while the machine is at rest and is increased to a full voltage as the bag is made. The vent hole is made on either or both sides of the bag near the top to allow for off-gassing of the rising foam. As described herein, the vent is made by turning the voltage off for a very brief period of time, typically 150 milliseconds.

Prior to the cartridge closing, the solvent pump and pumping system which is the subject of co-pending application Ser. No. 07/767,033, to Sperry et al. for "Improved Pumping and Cleaning System For Foam In Place Injection Cartridges," and filed concurrently herewith, activates for a cleaning cycle, typically of forty-five seconds. This time period is reset each time the cartridge opens and closes. The solvent used for cleaning the cartridge is held in a container mounted in a rack in the lower right side of the frame 21, but which is not otherwise illustrated herein. There is a solvent pump inside the solvent container as described in co-pending application Ser. No. 07/767,033, which delivers the solvent to the tip of the cartridge. The air pump mounted on the frame in any convenient location delivers air to the cartridge tip. The net effect is to combine a flow of solvent and the air to produce a frothing action on the tip of the cartridge which washes off the liquid foam. The general cleaning principle is also set forth in U.S. Pat. No. 4,898,327, which is also assigned to the assignee of the present invention.

Next, the actuator bar is pulled back into the female stop bracket by the solenoid to properly align it with the crosscut roller. At the same time the edge seal is being completed after the vent has been formed. The actuator bar is pushed forward by the solenoid into the foam filled bag. The crosscut wire sits at rest with an idle voltage. As the machine finishes feeding the bag, the crosscut wire goes to full voltage, the solenoid goes to the home position, and the film drive motor reverses direction to break the film apart. In a preferred embodiment a beep will sound a signal that the cycle is complete.

The device can be used in conjunction with any appropriate delivery system for foamable compositions or their precursors, such as the Instapack 808 dispenser system available from Sealed Air Corporation, Danbury, Conn.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A sealing roller system for sealing plastic film material that is in constant moving contact with a sealing roller, said sealing roller system comprising:
   a rotatable cylinder formed of a polymeric material that is sufficiently thermally conductive to dissipate heat quickly therefrom;
   an electrically conductive sealing wire wrapped around the circumference of said polymeric cylinder;
   means for periodically applying a voltage to said sealing wire to thereby generate a current therethrough sufficient to raise said sealing wire to a heated temperature that will seal plastic film material that is in moving contact with said cylinder, so that when plastic film material passes against said cylinder, said heated wire seals the plastic film material when such a sufficient voltage is applied, and so that when the applied voltage is lowered, said thermally conductive cylinder carries off sufficient heat to permit the sealing wire to leave a portion of the constantly moving plastic film material unsealed.

2. A sealing roller system according to claim 1 and further comprising:
   a groove in the circumference of said polymeric cylinder for receiving said sealing wire therein;
   a spring at either end of said sealing wire for applying a bias to said wire that maintains it in said groove during expansion and contraction of said wire as its temperature increases and decreases;

a spring receiving recess in portions of said groove for keeping said spring out of contact with plastic film material during sealing; and respective pins in said recess for attaching said springs thereto so that the bias of said springs helps maintain said wire in said groove and on said cylinder.

3. A sealing roller system according to claim 2 wherein said said pins are formed of electrically conductive materials so that a voltage applied to said pins will be correspondingly applied to said wire to heat said wire as the applied voltage generates a current therethrough.

4. A sealing roller system according to claim 3 and further comprising means for maintaining an idling voltage in said sealing wire that maintains said wire at a temperature below the temperature at which said wire will seal plastic, but which allows said wire to more quickly reach a sealing temperature upon command, and for reducing the extent and consequences of the thermal excursions of said wire.

5. A sealing roller system according to claim 1 wherein said wire is wrapped in a slight spiral pattern around said polymeric cylinder.

6. A sealing roller system according to claim 1 wherein said polymeric cylinder further comprises a temperature sensor.

7. A sealing roller system according to claim 1 and further comprising:

a first rotatable shaft having a pair of said polymeric cylinders mounted thereon;

a second rotatable shaft parallel to said first rotatable shaft;

a pair of drive rollers on said second shaft and positioned respectively opposite to said polymeric cylinders;

and wherein said first and second shafts are positioned sufficiently closely for rotation of said drive rollers to drive the rotation of said polymeric cylinders independently of the presence or absence of plastic film material between said drive rollers and said polymeric cylinders.

8. A sealing roller system according to claim 7 wherein said drive rollers are formed of RTV.

9. A sealing roller system according to claim 7 wherein said respective polymeric cylinders are positioned on said first shaft so that the pins on one of said respective polymeric cylinders are offset from the pins on the other of said respective polymeric cylinders.

10. A sealing roller system according to claim 7 and further comprising a pair of film guides above said first and second shafts for receiving a plastic film therebetween so that the plastic film is more efficiently presented to said drive rollers and said polymeric cylinders.

11. A sealing roller system according to claim 10 wherein said film guides comprise adjacent bars, parallel to said first and second shafts and positioned laterally away from the position at which the drive rolls and polymeric cylinders meet in a direction toward the drive rolls to thereby encourage the plastic film material to meet the drive rolls prior to meeting the polymeric cylinders and to thereby more effectively drive the advancing plastic film material.

12. A sealing roller system according to claim 11 wherein said film guide bars further comprise a plurality of downwardly depending guide canes for further directing an advancing plastic film between said drive rolls and said polymeric cylinders, and for preventing plastic film from wrapping around either of said shafts as it advances downwardly.

13. A sealing roller system according to claim 12 wherein at least some of said guide canes have flexible lower portions for preventing advancing plastic film from tearing whenever it engages said flexible lower portions.

14. A sealing roller system according to claim 7 wherein said first shaft has a plurality of electrical contact rings on one terminal end thereof in respective electrical contact with said pins and said wires for making electrical contact with a source of electricity and for providing a path for electrical current to flow from a source to said wires to thereby heat said wires to the temperature required to seal plastic film material.

* * * * *

UNITED STATES PATENT AND TRADEMARK OFFICE
CERTIFICATE OF CORRECTION

PATENT NO. : 5,376,219
DATED : December 27, 1994
INVENTOR(S) : Sperry et al.

It is certified that error appears in the above-indentified patent and that said Letters Patent is hereby corrected as shown below:

In column 2, line 47, "assemby" should be -- assembly --.

In column 3, line 7, after "31" insert a comma (,).

In column 5, line 36, "where" should be -- were --.

In column 5, line 58, after "features" insert -- of --.

In column 8, line 14, "as" should be -- is --.

In column 8, line 37, "canes" should be -- cane --.

In column 8, line 45, after "FIG. 8" insert a comma (,).

In column 9, line 5, omit "of" (first occurrence).

UNITED STATES PATENT AND TRADEMARK OFFICE
CERTIFICATE OF CORRECTION

PATENT NO. : 5,376,219
DATED : December 27, 1994
INVENTOR(S) : Sperry et al.

It is certified that error appears in the above-indentified patent and that said Letters Patent is hereby corrected as shown below:

In column 10, line 10, after "used" insert a comma (,).

In column 10, line 55, "92" should be -- 91 --.

In column 11, line 50, "chemical" should be -- chemicals --.

In column 12, line 16, after "time" insert a comma (,).

In column 13, line 9, omit "said" (second occurrence).

Signed and Sealed this

Twenty-fifth Day of April, 1995

Attest:

BRUCE LEHMAN

Attesting Officer     Commissioner of Patents and Trademarks